United States Patent [19]
Reuther

[11] 3,958,618
[45] May 25, 1976

[54] TIRE CHANGER MACHINE

[76] Inventor: Maurice A. Reuther, 225 N. Ashbrooke Circle, Fort Mitchell, Ky. 41017

[22] Filed: Oct. 1, 1974

[21] Appl. No.: 510,924

[52] U.S. Cl. .............................................. 157/1.2
[51] Int. Cl.² ........................................ B60C 25/08
[58] Field of Search ................... 157/1.17, 1.2, 1.22, 157/1.24, 1.3, 1.33, 1.28; 254/7, 8, 9, 122

[56] References Cited
UNITED STATES PATENTS

| | | | |
|---|---|---|---|
| 1,724,813 | 8/1929 | Weaver et al. | 157/1.2 |
| 1,793,806 | 2/1931 | Kellett | 254/7 R |
| 2,034,819 | 3/1936 | Maulis | 157/1.24 |
| 2,423,652 | 7/1947 | Kelly | 157/1.2 |
| 2,545,157 | 3/1951 | McCrary | 157/1.2 |
| 2,647,564 | 8/1953 | Douglass | 157/1.2 |
| 2,778,414 | 1/1957 | Oglesby | 157/1.2 |
| 2,818,108 | 12/1957 | Wells | 157/1.2 |
| 2,832,400 | 4/1958 | Laughlin | 157/1.28 |
| 3,426,827 | 2/1969 | Whited et al. | 157/1.26 |
| 3,493,029 | 2/1970 | Kimball | 157/1.2 |
| 3,782,442 | 1/1974 | James, Jr. | 157/1.26 |

*Primary Examiner*—Al Lawrence Smith
*Assistant Examiner*—James G. Smith
*Attorney, Agent, or Firm*—Wood, Herron & Evans

[57] ABSTRACT

A tire changer machine adapted for use with truck tires including a vertically oriented, stationary frame having a vertical center plane, front and rear faces parallel to that center plane, and a horizontal center axis. The floor of the frame is defined by two vertically adjustable rollers mounted thereon which support a tire positioned within the frame, a ramp oriented parallel to the frame's faces being connected to one of the rollers. A tire positioner device cooperates with a spring load roller linkage system for locating the tire coaxially with the frame's axis once the tire has been positioned within the frame. The frame also pivotally supports a plurality of bead breaker blades at each of the front and rear faces and each blade is radially adjustable relative to the center axis but is not laterally movable. A blade positioner device permits all blades to be adjusted equally and simultaneously. A ram is positioned coaxially with the center axis and adapted to move between extended and retracted positions relative to the frame's face. The nose of the ram is interconnectable with either a rim or a wheel by means of suitable connector tools, thereby mounting the rim or wheel in fixed engagement with the ram. A mount/demount tool drive shaft is concentric with the ram and is adapted to rotate relative thereto. In use, the ram is extended toward the front face until the front bead is broken and then retracted toward the ram face to break the rear bead.

13 Claims, 32 Drawing Figures

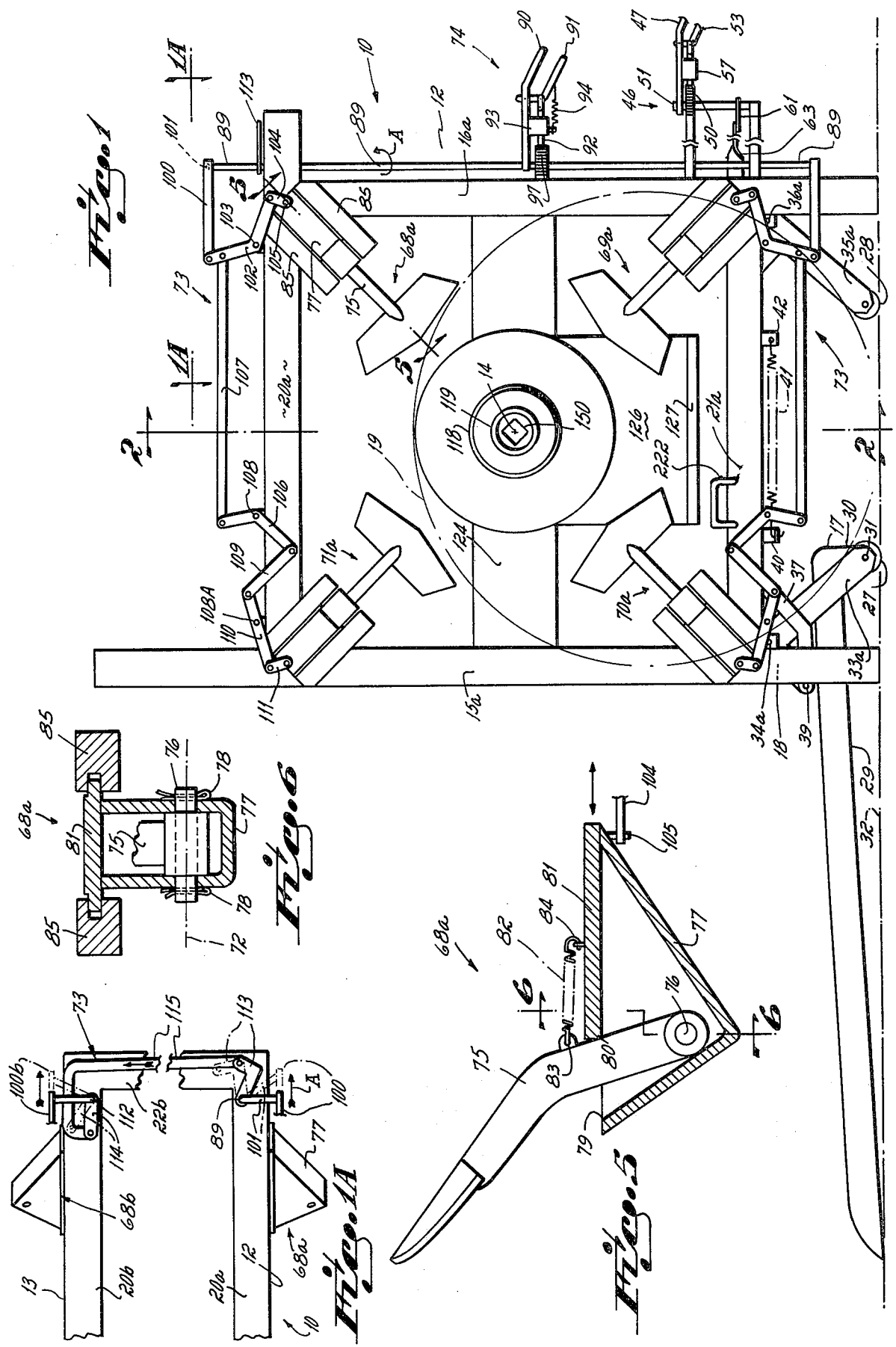

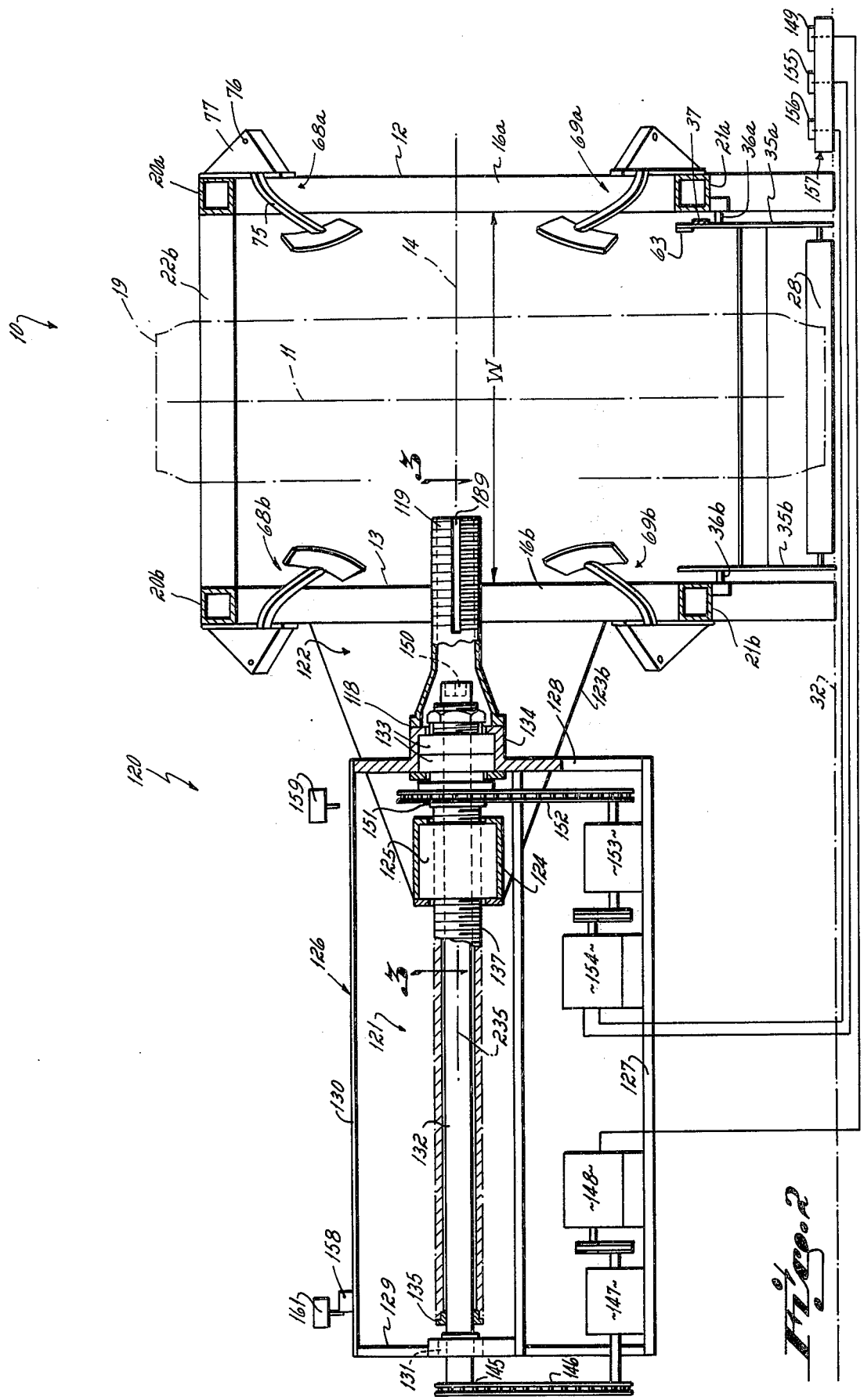

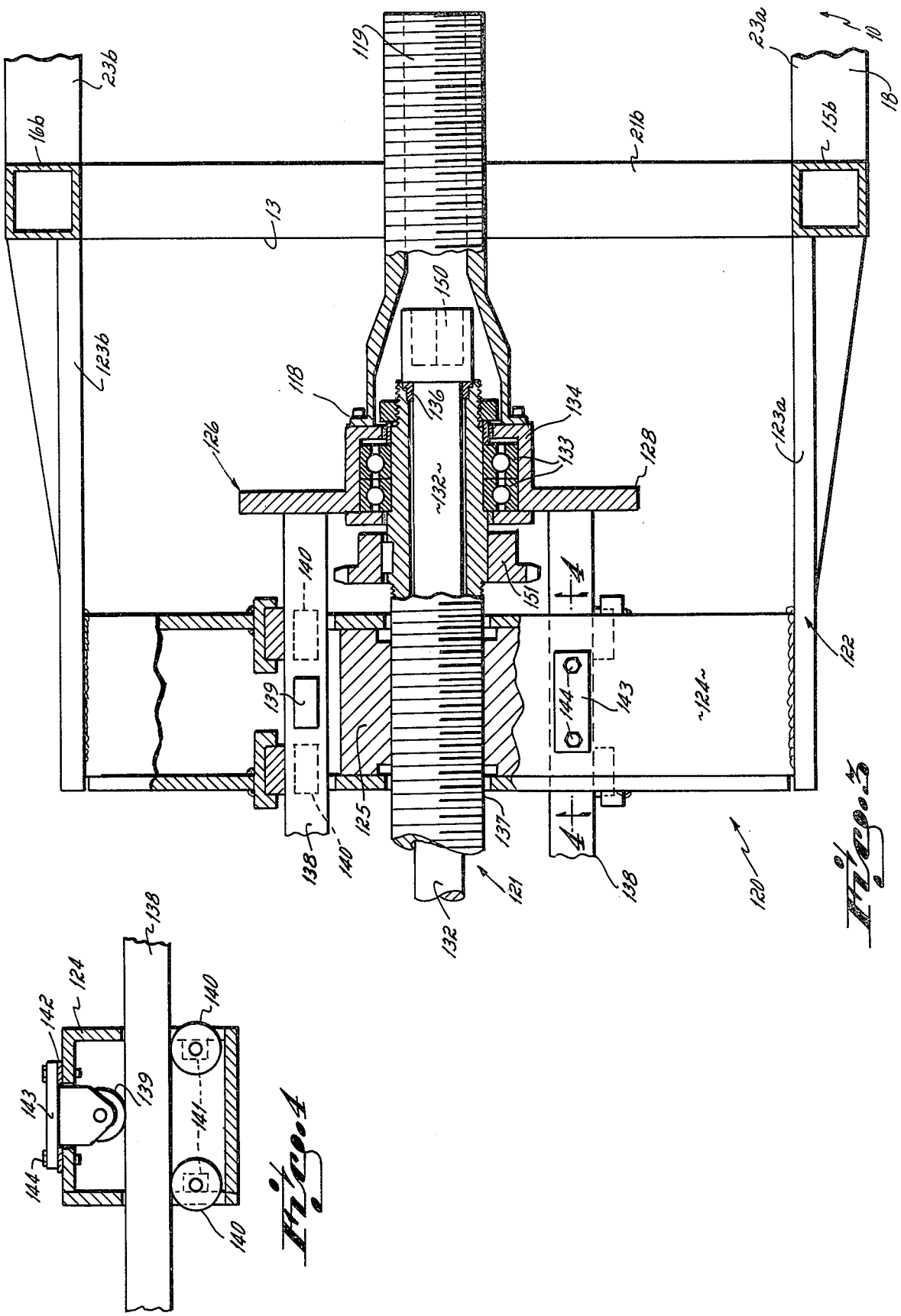

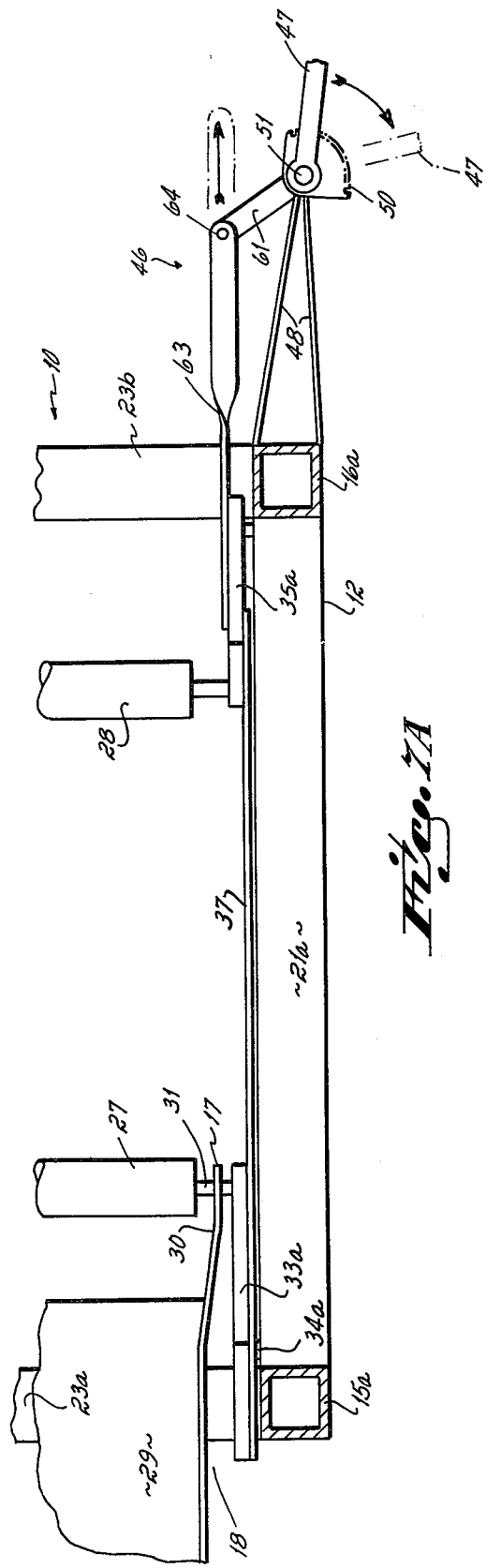
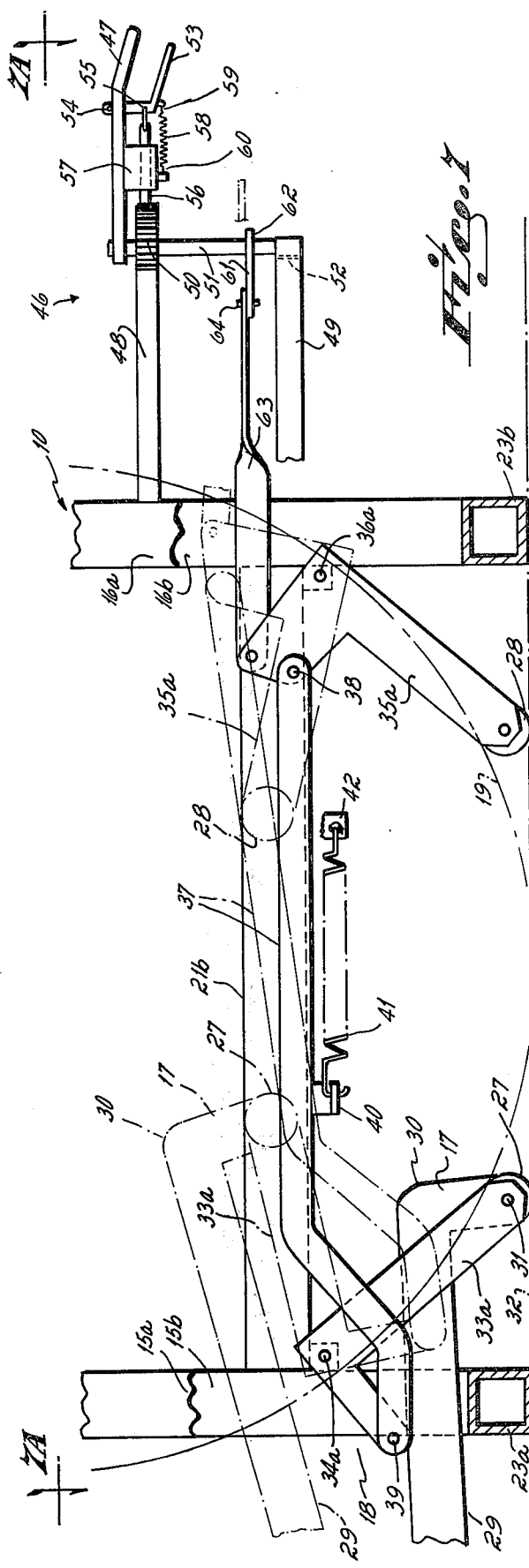

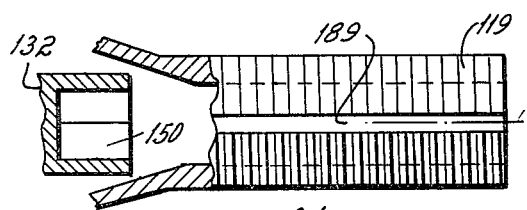
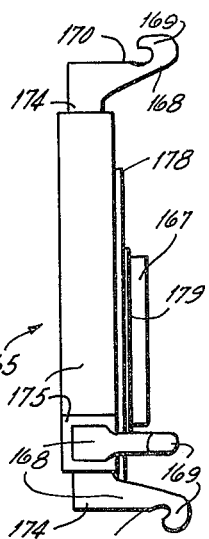
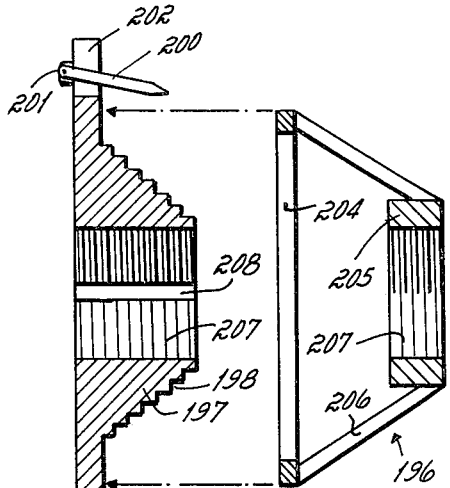
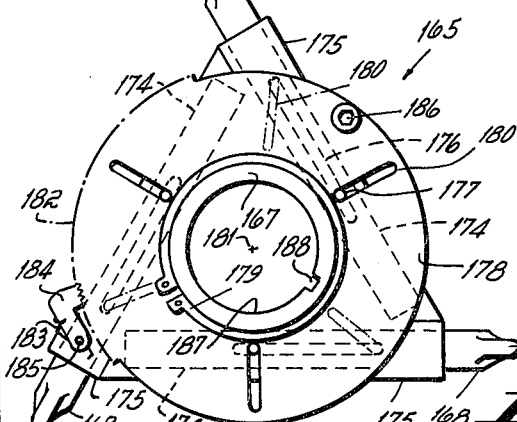
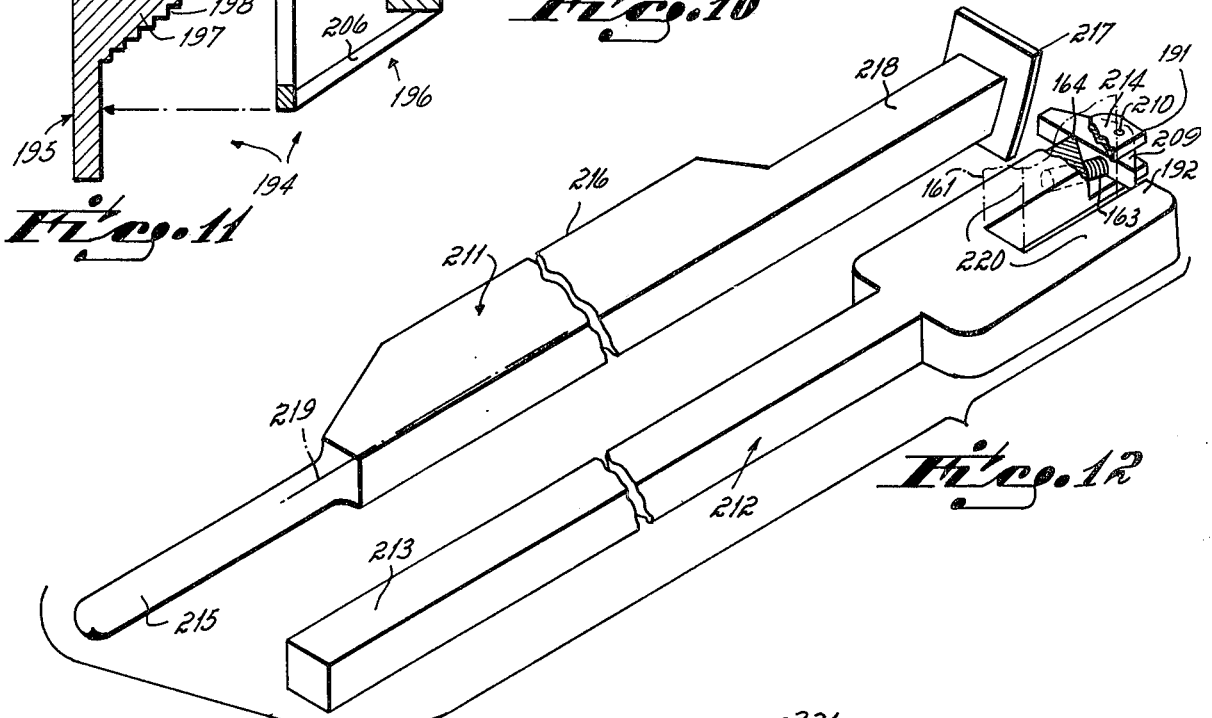
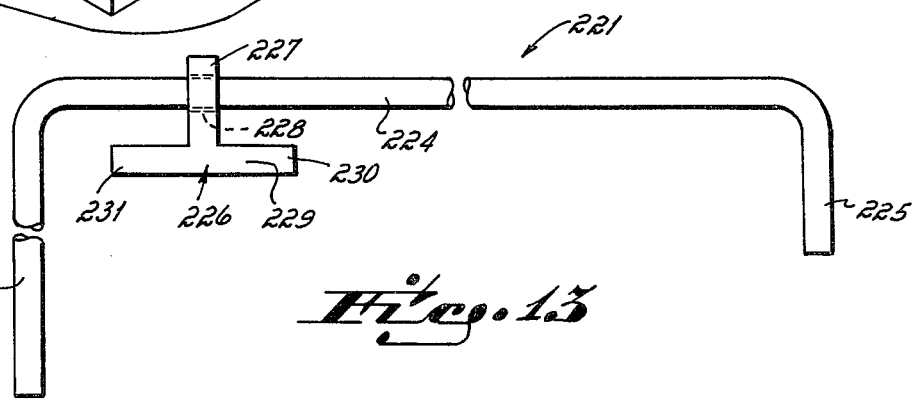

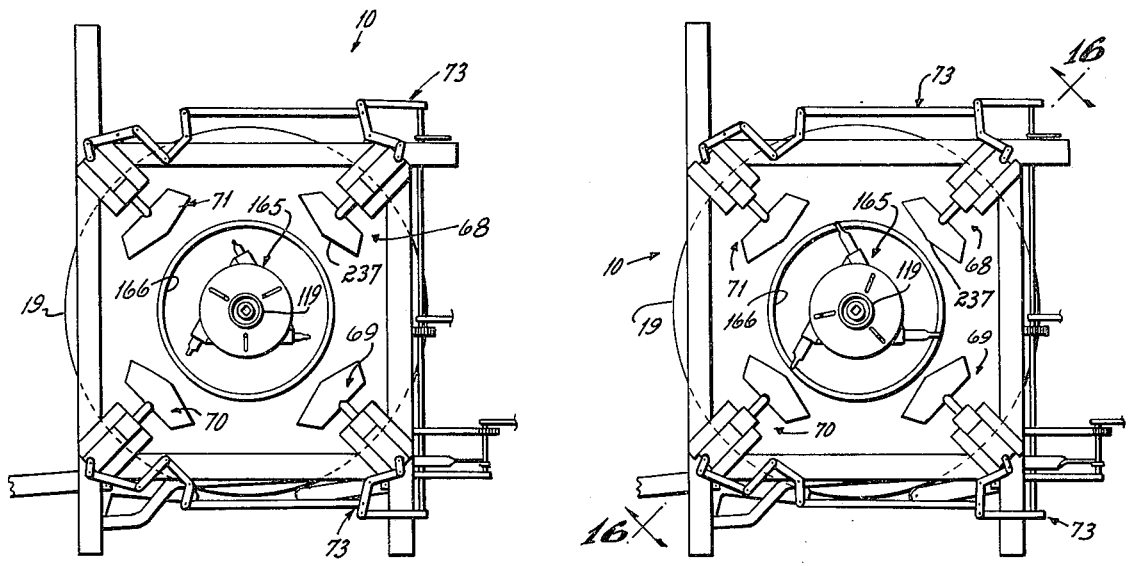
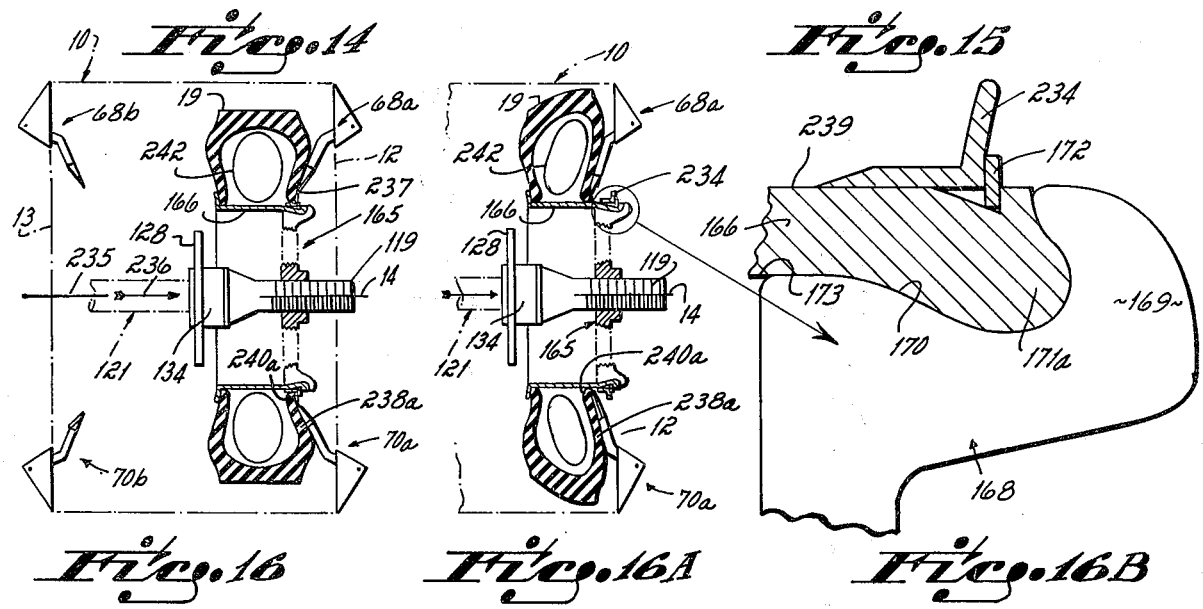
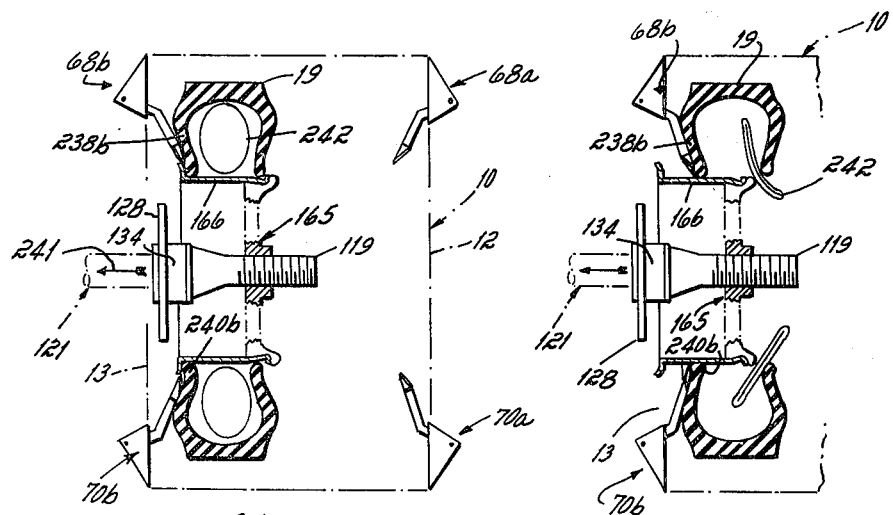

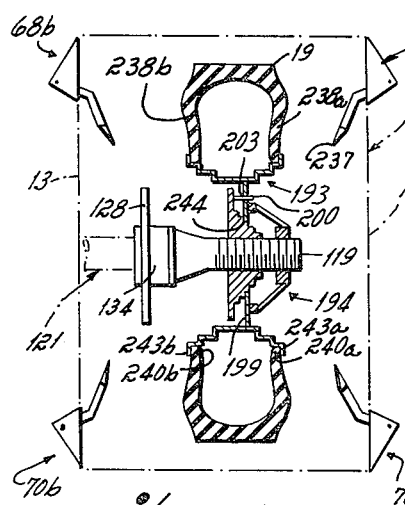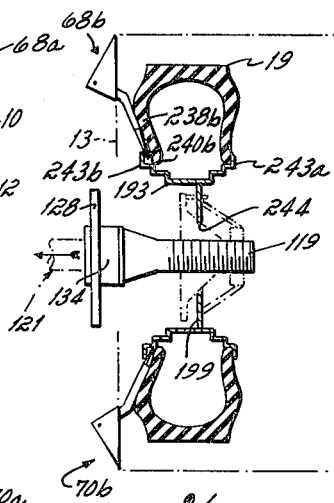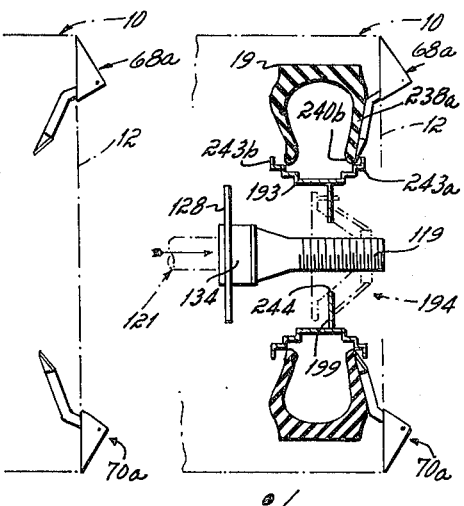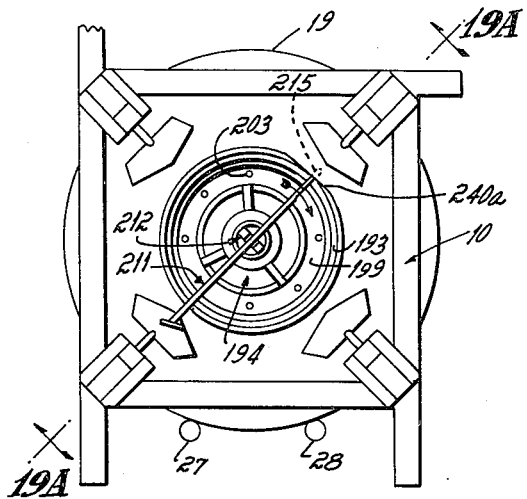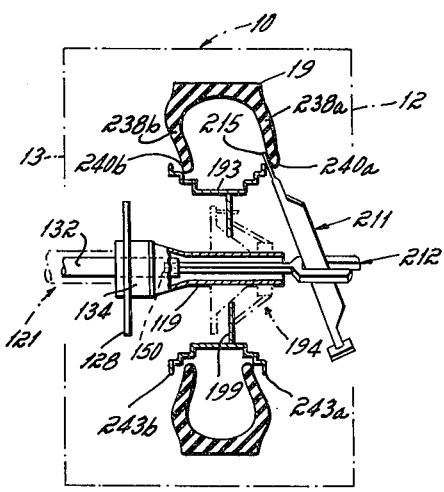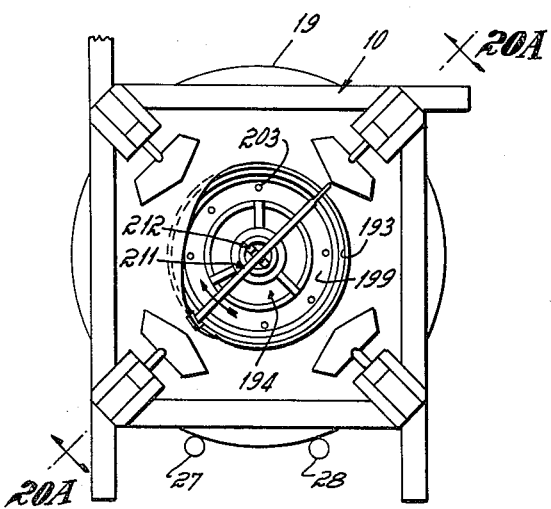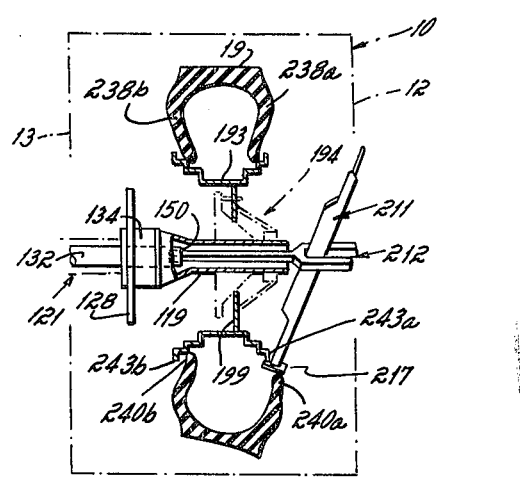

TIRE CHANGER MACHINE

This invention relates to tire changer machines. More particularly, this invention relates to a novel tire changer machine adapted for use with tires mounted on either a rim or a wheel, the rim or wheel being of a fixed flange or removable flange type.

A rim is basically a hollow cylindrical member or seat having a flange mounted thereto along each peripheral edge for restraining a tire on the seat. The cylindrical seat is fitted over a drum on a vheicle's axle when the tire is mounted in place on the vehicle. A wheel also includes a cylindrical member or seat having a flange mounted thereto along each peripheral edge, but the wheel is not hollow in that a center web fixed to the interior wall of the cylindrical seat is provided transverse to the wheel's axis. The wheel's center web provides stud bolt holes for fixing the wheel to an axle's stud bolts when the tire is mounted in place on the vehicle. Further, a rim or wheel may each be of a fixed flange type or a removable flange type. With the fixed flange type, the flange at each edge of the cylindrical seat is permanently fixed in place, i.e., is immovable, relative to the seat. With the fixed flange type, a tire's beads must be stretched or forced over the fixed flanges of the rim or wheel during demounting or mounting of the tire. With the removable flange type, one flange is permanently fixed to the seat and the other flange is removably fixed in place during use with a lock ring, thereby permitting removal of one flange during mounting or demounting of a tire. With the removable flange type, the lock ring is released and the flange removed so that a tire can be simply slid onto or off of the seat during mounting or demounting, respectively, thereby precluding the necessity of stretching the tire's beads over one of the flanges as is required with the fixed flange type. Further, the rim or wheel may be either of the flat base or drop center type. A so-called flat base rim or wheel has a flat seat, i.e., a regular circular contour in cross section, from one flange to the other. A drop center rim or wheel has a well formed in the seat, i.e., a reduced diameter subseat, intermediate the flanges to accommodate one of the tire's beads while the other is being forced or stretched over the wheel's flange during mounting or demounting.

Automatic tire changer machines are not new to the art. Such machines have long been used in connection with automobile tires. Commonly, such machines are located at gasoline stations, tire stores, or the like, and provide substantial mechanical assistance to an operator in demounting an old or worn out tire from a wheel, as well as in mounting a new or repaired tire onto the wheel, for the customer's passenger car. Generally, passenger car tires are mounted only on drop center wheels so the tire changer machines designed for such tires can be constructed for only that single end use.

Mechanical tire changer machines are also known for over-the-road truck tires. As with the automatic tire changer machine for automobile or passenger car tires, the primary function of a truck tire changer machine is to aid an operator in demounting a worn or undesireable tire, and in mounting a new or repaired tire. But such truck tire changer machines are generally of substantially different construction than the automatic tire changer machines designed for passenger car tires for the simple reason that truck tires are substantially larger, heavier, and stronger than passenger car tires. Further, and importantly, truck tires on over-the-road type equipment, e.g., cement trucks, semi-trailers, van-type trucks, may make use of either of the two basically different types of mounting structures for tires. These two basic type of structures are wheels and rims, and, as mentioned, either of these two basic structures may be flat base or drop center. Thus, mechanical truck tire changer machines should be capable of handling any of these type mounting structures for tires.

The primary objective of this invention is to provide an improved tire changer machine particularly adapted for over-the-road truck type tires, the machine incorporating novel apparatus and method for demounting a used tire from either a rim or a wheel, and for mounting a new or repaired tire onto that same rim or wheel, whether the rim or wheel be of the fixed flange or removable flange type, and whether the rim or wheel be of the flat base or drop center type.

In accord with this objective, the tire changer machine of this invention includes a vertically oriented main frame in the nature of a cage, the stationary main frame having a vertical center plane, front and rear faces parallel to that center plane, and a horizontal center axis normal to the center plane. The floor of the main frame is defined by two vertically adjustable rollers mounted to the main frame which serve to support a tire positioned within the frame, a ramp oriented parallel to the frame's faces being connected to one of the rollers for establishing easy ingress and egress of the tire to a position between the frame's faces. A tire positioner device cooperates with a spring loaded roller linkage system for locating the tire coaxially with the frame's axis once the tire has been positioned within the frame on the roller. The main frame also mounts a plurality of bead breaker blades at each of the frame's front and rear faces. The bead breaker blades are each mounted to pivot between inner and outer limits on an axis that lies in the respective one of the frame's faces, and each is radially adjustable relative to the frame's center axis but is not laterally movable relative to the frame's center axis. A blade positioner device cooperates with a blade linkage system for permitting all blades on both front and back faces to be adjusted equally and simultaneously. A force frame structure is interconnected with the stationery main frame, the force frame structure including a ram positioned coaxially with the main frame's center axis and adapted to move between extended and retracted positions relative to the main frame's faces. The nose of the ram is interconnectable with either a rim or a wheel by means of suitable connector tools, thereby mounting the rim or wheel (with or without tire thereon) in fixed engagement with the ram. A mount/demount tool drive shaft is concentric with the ram and is adapted to rotate relative thereto. In use, and when demounting a tire, the tire is initially rolled up the ramp into the tire cage, the vertical position of the tire support rollers being manually adjusted so as to coaxially dispose the rotational axis of the rim or wheel with the center axis of the tire cage and, hence, of the ram. The ram nose is then extended into proximity with the rim or wheel, the rim or wheel being mounted or fixed in place on the ram by a connector tool. The bead breaker blades are also radially located just outward of the flanges of the rim or wheel. Thereafter, the ram is extended toward the front face of the main frame until the front bead of the tire is broken away from the front flange of the rim or wheel due to force contact of the tire's front side wall against the front face bead breaker blades, and the ram is then retracted toward the rear face of the main frame until the rear bead of the tire is broken away from the rear flange of the rim or wheel due to force contact of the tire's rear side wall against the rear face bead breaker blades. A rim or wheel of the type which incorporates a removable flange/lock ring structure may have a tire mounted and demounted simply through use of the force ram. A rim or wheel with fixed in place flanges may require a mount/demount tire tool to be connected with the tire tool drive shaft, that tool being rotated by that drive shaft to force the beads off of or onto the rim or wheel as desired.

Other objectives and advantages of this invention will be more apparent from the following detailed description taken in conjunction with the drawings in which FIG. 1 is a front view of a novel tire changer machine structured in accord with the principles of this invention;

FIG. 1A is a cross-sectional view taken along line 1A—1A of FIG. 1;

FIG. 2 is an end view of the tire changer machine illustrated in FIG. 1;

FIG. 3 is a cross-sectional view taken along lines 3—3 of FIG. 2;

FIG. 4 is a cross-sectional view taken along line 4—4 of FIG. 3;

FIG. 5 is a cross-sectional view taken along line 5—5 of FIG. 4;

FIG. 6 is a cross-sectional view taken along line 6—6 of FIG. 5;

FIG. 7 is a detailed front view of the tire positioner device;

FIG. 7A is a cross-sectional view taken along line 7A—7A of FIG. 7;

FIG. 8 is an enlarged top view of the machine's ram nose;

FIG. 9 is a side view of a key adapted to restrain a rim holder in mounted relation with the ram nose;

FIG. 10 is a top view of a rim holder;

FIG. 10A is a side view of the rim holder illustrated in FIG. 10;

FIG. 11 is a cross-sectional side view of a wheel holder in disassembled relation;

FIG. 12 illustrates a drive yoke for a standard mount/demount tool, and the standard mount/demount tool, adapted to be connected with the machine's tire tool drive shaft;

FIG. 13 illustrates a novel mount/demount tool adapted to be connected with the machine's main frame;

FIG. 14 is a schematic front view of the machine showing a tube tire mounted on a flat base rim located in coaxial relation with the rim holder prior to demounting;

FIG. 15 is a view similar to FIG. 14 but showing the bead breaker blades properly positioned and the rim holder fixing the rim to the ram nose;

FIG. 16 is a cross-sectional view taken along line 16—16 of FIG. 15 and illustrating extension of the ram into initial contact with the front face bead breaker blades;

FIG. 16A is a view similar to FIG. 16 but showing the tire's front bead broken away from the rim's lock ring and front flange;

FIG. 16B is a greatly enlarged view of that area encircled in FIG. 16A;

FIG. 17 is a view similar to FIG. 16 and 16A, but showing retraction of the ram into subsequent contact with the rear face bead breaker blades after the rim's lock ring and removable flange have been taken off the rim's seat;

FIG. 17A is a view similar to FIG. 16A, but illustrating the tire's rear bead broken away from the rim's rear flange and removal of the tube and tire from the rim;

FIG. 18 is a schematic cross-sectional view of the machine showing a tubeless tire mounted on a drop center wheel and fixed on the ram nose by the wheel holder prior to demounting;

FIG. 18A is a view similar to FIG. 18 but illustrating retraction of the ram into initial contact with the rear face bead breaker blades;

FIG. 18B is a view similar to FIG. 18 but illustrating extension of the ram into subsequent contact with the front face bead breaker blades;

FIG. 19 is a schematic front view illustrating the standard mount/demount tool and yoke in operative combination with the machine's tire tool drive shaft for demounting the tubeless tire from the drop center wheel;

FIG. 19A is a cross-sectional view taken along line 19A—19A of FIG. 19;

FIG. 20 is a schematic front view similar to FIG. 19 but illustrating the standard mount/demount tool and yoke in operative combination with the machine's tire tool drive shaft for mounting the tubeless tire onto the drop center wheel;

FIG. 20A is a cross-sectional view taken along line 20A—20A of FIG. 20;

Figure 21:
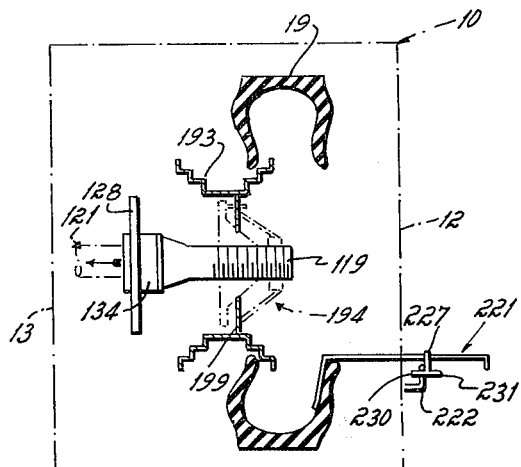
FIG. 21 is a schematic cross-sectional view similar to FIG. 19A but illustrating demounting of a tubeless tire from a drop center wheel with a novel mount/demount tool in operative combination with the machine's main frame.

The tire changer machine structure of this invention is particularly illustrated in FIGS. 1–7A, and 22. The different tools particularly adapted for use with the tire changer machine of this invention are illustrated in FIGS. 8–13. The methods of operation of the tire changer machine of this invention are illustrated in FIGS. 14–21A.

TIRE CHANGER MACHINE STRUCTURE

As illustrated in FIGS. 1 and 2, the basic tire changer machine structure of this invention includes a stationary tire cage 10, i.e., a main frame, that is generally vertically oriented. The main frame 10 includes a vertical center plane 11, front 12 and rear 13 faces equidistant from and parallel to that center plane 11, and a horizontal center axis 14 disposed normal or transverse to that center plane 11. In effect, the center plane is the plane of the tire when the tire is rolled into the main frame for mounting or demounting purposes.

The main frame includes vertical corner members 15a, 15b, 16a, 16b, the corner members 15a, 15b defining the ingress/egress opening 18 to the interior of the tire cage 10 for a tire 19. The corner members 15, 16 are connected onto a rigid framework by top members 20a, 20b, bottom frame side members 21a, 21b, top cross members 22a, 22b, and bottom cross members 23a, 23b, all of which are welded into an integral structure so as to provide the one piece main frame 10. The frame members 15a, 16a, 20a, 21a of the main frame 10 define the frame's front face 12, and frame members 15b, 16b, 20b, 21b define the frame's rear face 13, the machine's operator positioning himself at the front face of the tire changer machine when using same as will be apparent from the detailed description below.

Figure 22:
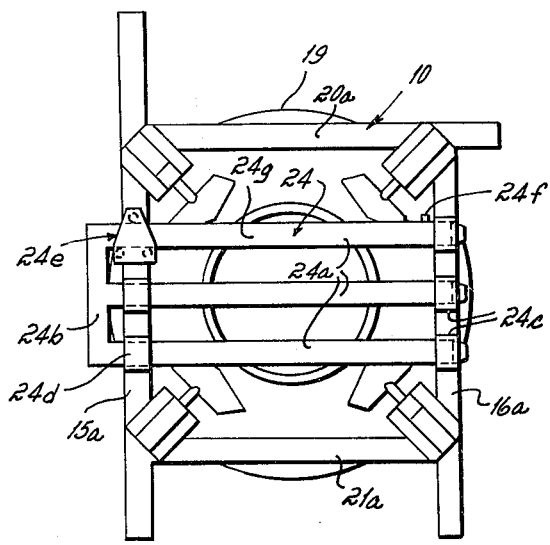
FIG. 22 illustrates a safety door structure on the front face of the stationary main frame.

As seen only in FIG. 22, the main frame 10 also mounts a safety door 24, the door being mounted to the front face 12. This door comprises three horizontal members 24a interconnected at one end by a vertical member 24b to define a three-pronged fork. The fork-shaped door 24 is slidably mounted on a horizontal path with respect to the front face 12 in a plane parallel to the center plane 11 of the tire cage 10 by three straps 24c fixedly secured to corner member 15a and by two straps 24d and a load carrying roller assembly 24e secured to the opposite corner member 16a. The roller assembly 24e is positioned so as to engage the upper and lower surfaces of the top tong 24g. This top tong 24g mounts, on its upper surface, a travel limiter detent 24f which keeps the safety door 24 in operational relation with the main frame 10.

The floor of the tire cage or main frame 10 is defined by two vertically adjustable rollers 27, 28 disposed transverse to the frame's center plane 11 and connected to the main frame, the rollers serving to support tire 19 when located in operating position within the tire frame and extending across the width W of the tire frame. A ramp 29 is carried at one end 30 by arms 17 on the axle 31 of roller 27 and rests on, i.e., is not fixed to, floor 32 at the other end, the ramp being positioned between and parallel to the frame's front 12 and rear 13 faces. The ramp 29, of course, permits easy ingress and egress of the tire 19 to its operating position between the frames' faces 12, 13 as the tire can be simply rolled up or down the ramp into or out of operating position. More particularly, the ramp roller 27 is rotatably carried between a first pair of bellcranks 33a, 33b each bellcrank being pivotally mounted to the respective main frame's vertical corner members 15a, 15b at pivot points 34a, 34b. The idler roller 28 is rotatably carried between a second pair of bellcranks 35a, 35b, each bellcrank being pivotally mounted to the respective main frame's vertical corner members 16a, 16b at pivot points 36a, 36b. The front pair of bellcranks 33a, 35a, and the rear pair of bellcranks 33b, 35b, are each interconnected one with the other by means of a connector link 37 that is pivotally mounted, as at 38, 39, to that arm of each bellcrank which does not carry rollers 27, 28, thereby providing equal and simultaneous vertical movement between the rollers. Note that each connector link 37 is provided with an ear 40 intermediate its length. A helper spring 41 is connected at one end to the link's ear 40, and at the other end to ear 42 fixed to the main frame 10. The helper spring 41 is a tension spring, thereby tending to rotate the bellcranks so as to continuously bias the tire support rollers 27, 28 toward the phantom line position illustrated in FIG. 7.

A tire positioner device 46 is provided at, and is interconnected with, the tire frame 10 adjacent the floor 32 to which the frame is fixed.

The tire positioner device 46 is connected with rollers 27, 28 to provide for the vertical adjustment of those rollers as desired. The tire positioner device 46 is operated through a handle 47 that is manually movable in a horizontal plane. The positioner device 46 includes top 48 and bottom 49 framework members fixed to upright frame member 16a, and a rack 50 fixed in position on that framework, thereby fixing the rack in position relative to the main frame 10. A vertically oriented drive shaft 51 is rotatably carried in appropriate bearing members 52 provided in the top 48 and bottom 49 members of the framework, and the handle 47 being fixed to and extending normal from that drive shaft. A trigger 53 is pivotally mounted to the handle 47 as at 54, the trigger being pivotally connected as at 55 with a latch pin 56 slidably carried in sleeve 57, and the sleeve being fixed to the handle. Spring 58 is fixed at one end 59 to the trigger and at the other end 60 to the sleeve, thereby continuously loading the latch pin toward latching engagement with the rack 50 so as to restrain the handle 47 in the as set arcuate position relative to the rack 50. The drive shaft 51 is also connected to the idler roller bellcrank 35a by means of a lever arm 61 fixed at one end 62 to the drive shaft and pivotally connected to a drive link 63 at the other end 64. The drive link 63 also is pivotally connected to that arm of the idler roller bellcrank 35a to which the connector link 37 is pivotally connected. Therefore, manual rotation of the handle 47 by an operator from the solid line position illustrated in FIG. 7A to the phantom line position illustrated in FIG. 7A causes the drive link 63 to move from the solid line position illustrated in FIG. 7A to the phantom line position illustrated in FIG. 7A, thereby causing the pairs 33, 35 of bellcranks, and, hence, the tire support rollers 27, 28 to move from the solid line position illustrated in FIG. 7 to the phantom line position illustrated in FIG. 7. Use of the tire positioner device 46 permits a tire 19 mounted on a rim or wheel, and which has been rolled up the ramp and into the tire frame 10 as shown in FIGS. 27 and 14, to be oriented so that the rim or wheel on which the tire is mounted is positioned coaxially with the center axis 14 of the tire frame. No matter what the original diameter of the tire 19 (within the vertical travel limits of the rollers 27, 28), this is accomplished simply by manually orienting the handle 47 into that location which so positions the tire. The tire 19 is restrained in the desired location because the handle itself is restrained as set by the spring 58 loaded interengagement of the latch pin 56 with the rack 50. As a practical matter, when the tire 19 is initially rolled up the ramp 29 into the main frame 10 onto the rollers 27, 28, same would usually depress the rollers to floor 32 level because of the weight of the tire if those rollers were not retained in a preset position by spring loaded interengagement of latch pin 56 and rack 50 of the tire positioner device. But raising of the tire 19 from that floor 32 level position into the desired coaxial location with the center axis 14 of the main frame 10 is aided by helper spring 41 which tends to raise the rollers 27, 28 toward the phantom line position during manual relocation of the handle 47. Thus, the tire positioner device 46 cooperates with a helper spring 41 loaded linkage 33, 35, 37, 63 system for locating the tire 19 coaxially with the frame's center axis 14.

A series of bead breaker blades 68a, 69a, 70a, 71a, and 68b, 69b, 70b, 71b, is attached to each of the front 12 and rear 13 faces of the stationary tire cage or main frame 10, see FIGS. 1 and 2. Four blades 68a–71a are disposed in the front face 12 of the main frame 10, and four blades 68b–71b are disposed in the rear face 13 of the main frame. The blades 68–71 are not movable laterally along the center axis 14 of the main frame, although they are movable and adjustable radially relative to that center axis. Further, each of the blades 68–71 is pivotable between set limits on a pivot axis 72 that is approximately in the plane of the front face or rear face, respectively, see FIGS. 5 and 6. A blade linkage system 73 interconnects all blades 68–71 one with the other. The blades 68–71 are adjustable in their radial movement relative to the main frame's axis 14 by manual operation of a single blade positioner device 74, all blades, in both the front 12 and rear 13 faces of the main frame 10, being simultaneously movable an equal distance radially inward or radially outward relative to the center axis of the main frame because all are interconnected through the common blade linkage system 73.

More particularly in connection with the bead breaker blades 68–71, each blade assembly includes the blade 68–71 itself which is in the nature of a flat, spade-shaped element disposed generally adjacent the plane of the frame's front 12 or rear 13 face, see FIGS. 1, 2, 5 and 6. Each blade 68–71 is formed integral with a mounting arm 75 having a pivot pin 76 at the end opposite to the blade end. Each blade 68–71 assembly also includes a blade holder 77 that carries the blade's pivot pin 76, and the pivot pin (and, hence, the blade) being restrained with that blade holder by cotter pins 78, thereby pivotally mounting the blade to the blade holder. Each blade 68–71 assembly also includes a slide plate 81 fixed to the blade holder 77. The holder 77 and the slide plate 81 cooperate by providng edges 79, 80 to define the maximum limits of the blade's pivotal movement, compare the solid line position to the phantom line position of the blade in FIG. 5. Each blade 68–71 is continuously spring 82 loaded toward a home position, the spring being fixed at one end 83 to the blade's mounting arm 75 and at the other end 84 to the slide plate 81. Each blade holder 77 is slidably mounted to the main frame 10 by virtue of slide plate 81 being restrained in slide tracks 85 fixed to structural members 15, 16, 20, 21 of the main frame. The slide tracks 85 are all oriented relative to the center axis 14 of the main frame so that the blades 68–71 will move radially relative to the center axis 14 of the main frame 10 as the holders 77 slide within the tracks. When the blades 68–71 are thus mounted on the main frame 10, each blade is thereby spring 82 loaded toward the center plane 11 of the main frame and adapted to pivot a set distance outwardly away from that center plane against the bias of spring 82. As noted, each of the blade assemblies which includes blades 68–71, blade holders 77, slide plates 81, spring 82 and slide tracks 85 are of identical structure.

Each of the blade 68–71 assemblies is interconnected through the blade linkage system 73, with the blade positioner device 74, see FIGS. 1 and 1A. The blade positioner device 74 includes a vertically oriented front drive rod 89 fixed to manually operable handle 90 structure and is generally similar to the tire positioner device 46 illustrated in FIGS. 7 and 7A and described above. Note that the blade positioner device 74 is located adjacent the front face 12 of the main frame on the right-hand side thereof as viewed in FIG. 1 just as is the tire positioner device so located. The manually operable handle 90 is adapted to rotate in a horizontal plane, and includes a trigger 91 pivotally fixed thereto. The trigger 91 carries a latch pin 92 which is slidable in sleeve 93 also fixed to the handle 90. A tension spring 94 is fixed at one end to the trigger 91 and at the other end to the sleeve 93 to continuously bias the latch pin 92 into latching relation with rack 97 fixed to corner post 16a of the main frame. The front drive rod 89 passes through the rack 97, thereby providing a bearing for that drive rod.

The front drive rod 89 extends upwardly from the blade positioner device 74 adjacent to the top side member 20a of the main frame 10 for driving interconnection with the top two blades 68a, 71a at the front face 12 of the frame, and also extends downwardly adjacent the bottom side member 21a of the main frame for driving interconnection with the bottom two blades 69a, 70a at the front face of the frame, see FIG. 1. The driving interconnection with the top two blades 68a, 71a in the front face 12 of the frame is part of the overall blade linkage system 73. The driving interconnection includes a primary drive bar 100 permanently fixed at one end to the drive rod through the drive rod's arm 101, see FIG. 1A, and pivotally connected at the other end to one arm of a primary bellcrank 102 that is pivotally mounted to top side frame member 20a as at 103, see FIG. 1. The other arm of the bellcrank 102 is interconnected with the holder 77 for blade 68a through connector link 104, the connector link being pivotally connected to that other arm of the bellcrank 102 at one end and pivotally connected through pin 105 to the holder, see FIGS. 1 and 5. The primary bellcrank 102 is connected with a secondary bellcrank 106 through secondary drive bar 107, the secondary drive bar 107 being pivotally connected at one end to that same arm of the primary bellcrank to which the primary drive bar 100 is connected and being pivotally connected to one arm of the secondary bellcrank at the other end. The other arm of the secondary bellcrank 106 is pivotally connected to one end of a transfer link 109, and the other end of that transfer link is pivotally connected to one end of a lever link 110. The other end of the lever link 110 is pivotally connected to one end of a connector link 111, and the other end of the connector link is pivotally connected to holder 77 for blade 71a by pin 105. The secondary bellcrank 106 is also pivotally fixed to top side frame member 20a as at 108, and the lever link also pivotally connected to the top side frame member 20a as at 108A. Thus, rotation of the front drive rod 89 in the direction of arrow A, as illustrated in FIGS. 1 and 1A, causes the primary drive bar 100 to move into the phantom line position illustrated in FIG. 1A, thereby pivoting the primary bellcrank 102 clockwise so as to move the blade 68a radially inward toward the center axis 14 of the main frame 10 by causing the blade 68a, slide plate 81 to slide in its tracks 85. Further, movement of the primary drive bar 100 from the solid line position shown in FIG. 1A to the phantom line position shown in FIG. 1A also moves the secondary drive bar 107 in that same direction because of the interconnection through bellcrank 102, thereby pivoting the secondary bellcrank 106 clockwise so as to move the blade 71a radially inward toward the center axis 14 of the main frame by causing the blade 71a, slide plate 81 to slide in tracks 85 through the connection provided by links 109, 110, and 111.

The structure and operation of that part of the blade linkage system which connects the front drive rod 89 with the bottom two blades 69a, 70a, of the four blades 68a–71a illustrated on the front face 12 of the main frame 10 is identical to that just described for the top two blades 68a, 71a except that same is connected to the base of the front drive rod 89.

The front drive rod 89, as activated by blade positioner device 74, also drives that part of the blade linkage system 73 which interconnects the four blades 68b–71b in the rear face 13 of the main frame. That part of the blade linkage system 73 interconnecting the top two blades 68b, 71b at the rear face 13 of the main frame 10, and that part of the blade linkage system interconnecting the bottom two blades 69b, 70b at the rear face 13 of the main frame 10, are identical to the top and bottom parts, respectively, of the blade linkage system described immediately above for the top two blades 68a, 71a and the bottom two blades 69a, 70a in the front face 12 of the main frame, except that those rear blade linkage system parts are connected directly to a rear drive rod 112 instead of being directly connected to front drive rod 89, see FIG. 1A. In other words, the rear drive rod 112 is vertically positioned in a manner identical to the front drive rod 89 and interconnects with that part of the blade linkage system 73 for the top two blades 68b, 71b on the rear face 13 of the main frame, and with that part of the blade linkage system for the bottom two blades 69b, 70b in the rear face of the main frame, by a primary drive bar 100b just as is provided for the four blades 68a–71a in the front face 12 of the main frame. Further, as shown in FIG. 1A, a front transfer arm 113 is fixed to the front drive rod 89, and a rear transfer arm 114 is fixed to the rear drive rod 112, adjacent the top end of each. A connecting transfer arm 115 is pivotally connected at its ends between the front 113 and the rear 114 transfer arms respectively, thereby providing a driving interconnection between front 89 and rear 112 drive rods. Thus, and as illustrated in FIG. 1 and 1A, as the front drive rod 89 is rotated in the direction illustrated by arrow A through use of manual handle 90, that rotation of the front drive rod is transmitted into identical rotation of the rear drive rod 112 through front transfer arm 113, connecting transfer arm 115, and rear transfer arm 114. This, in turn, activates those parts of the blade linkage drive system 73 for the top two blades 68b, 71b in the rear face 13 of the main frame, and the bottom two blades 69b, 70b in the rear face of the main frame, in a manner identical to that which occurs for the top two blades 68a, 71a and bottom two blades 69a, 70a in the front face 12 of the main frame. The result is that all blades 68–71 in both faces 12, 13 of the main frame 10 are radially oriented either inwardly or outwardly depending on the direction of rotation of the manually operated handle 74, and the radial distance which each blade is so moved is equal to that distance all other blades are moved, thereby simultaneously positioning all eight blades into the same radial distance from the center axis 14 of the main frame as desired by the machine's operator.

A force frame structure 120 is connected with the stationary main frame 10, the force frame structure carrying a ram 121 mechanism positioned coaxially with the main frame's center axis 14 and adapted to move between extended and retracted positions relative to the main frame's faces 12, 13, see FIGS. 2 and 3. The force frame structure 120 includes a support frame 122 fixed to the stationary or main frame 10 for carrying the ram 121 mechanism. The frame 122 includes a pair of side webs 123 extending rearwardly from the rear face 13 of the main frame, each of the webs 123a, 123b being fixed to a respective vertical corner member 15a 16b of the main frame. A cross frame 124 is fixed in place between the two webs 123a, 123b, and is part of the support frame 122. The cross frame 124 is generally tubular in cross-sectional configuration, see FIGS. 2–4, and carries a follower nut 125 coaxially oriented with the main frame's center axis 14.

The ram 121 mechanism includes, as is apparent from FIGS. 2 and 3, tire tool drive shaft 132 carried within hollow ram 121 in coaxial fashion. The housing for the ram mechanism includes a movable ram frame 126 having floor 127 end walls 128, 129, and cover 130. The rear end wall 129 mounts bearing 131 that carries the rear end of the tire tool drive shaft 132, and the front end wall 128 mounts a bearing support housing 134 for two bearings 133 that carry the front end of the ram 121. The rear end of the ram 121 is carried by a sleeve bearing positioned between the exterior surface of the tire tool drive shaft 132 and the interior surface of the hollow ram 121, see FIG. 2, and the tire tool drive shaft is carried at the front end of the ram 121 by a similar bearing 136 also positioned between the exterior surface of the tire tool drive shaft 132 and the interior surface of the hollow ram 121, see FIG. 3. Thus, the tire tool drive shaft 132 and the ram 121 are coaxially disposed one with the other, and are rotatable relative one to the other, both the shafts positioned coaxially with the center axis 14 of the main frame 10 as illustrated in FIG. 2. A hollow or tubular ram nose 119 is fixed to the bearing housing 134 as at 118, and is disposed concentric with the ram 121 and tire tool drive shaft 132. But the ram nose 119 does not rotate since it is fixed to the movable ram frame 126.

The tire tool drive shaft 132/ram 121/movable ram frame 126 structure, as mentioned, is carried on follower nut 125 mounted in cross frame 124 of fixed support frame 122. The follower nut 125 is threadedly engaged with the exteriorly threaded surface 137 of the ram 121. Further, the tire tool drive shaft 132/ram 121/movable ram frame 126 structure is also carried in the stationery cross frame 124 by virtue of guide rails 138 fixed to the movable ram frame. Two guide rails 138 are provided, on each side of the follower nut 125 as is illustrated in FIG. 3, and each being fixed to rear end wall 129 at one end and front end wall 128 at the other end. Three guide rollers 139, 140-140 are fixed to the cross frame 124 on each side of the follower nut, and are positioned to cooperate with the guide rails 138, see FIGS. 3 and 4, each of the bottom rollers 140 being rotatably connected to the frame 124 side walls by bearings 141 so that the guide rails rest on those rollers. The single top roll 139 for each rail 138 is adjustably fixed above the rail such that shims 142 may be interposed between the rollers's mounting plot 143 (adjustable through use of bolts 144) and the cross frame 124 to maintain the horizontal travel path of the ram 121 during extension and retraction thereof relative to the stationery tire cage frame 10.

The drive mechanisms for the tire tool drive shaft 132, and for the ram 121, are also illustrated in FIGS. 2 and 3. The tire tool drive shaft 132 is driven off sprocket 145 fixed to shaft 132, the sprocket 145 being fixed by chain 146 to gear reducer 147. The tire tool drive shaft's gear reducer 147 is driven by tool shaft motor 148, the "on"/"off" switch of that electric motor being controlled by foot pedal 149 positioned comfortably on the floor 32 adjacent the front face 12 of the main frame. Thus, the tire tool drive shaft 132 may be rotatably driven when desired by motor 148 independent of the ram 121. In use, tire tool socket 150 fixed to the front end of the tire tool drive shaft 132 (and accessible through the hollow ram nose 119) is rotatable when the tire tool drive shaft is rotated. This, in turn, causes the tire tool interconnected with the tire tool drive shaft's adapter to rotate as is described in detail below.

The ram 121 drive mechanism includes drive sprocket 151 fixed to the ram 121, that sprocket being interconnected by chain 152 with gear reducer 153. The gear reducer 153 is driven by electric motor 154 which has its interior controls connected with a clockwise rotation foot pedal 155 and a counterclockwise rotation foot pedal 156, these pedals being incorporated with same pedal board 157 as motor 148 controls pedal 149. Thus, the ram 121 may be rotatably driven when desired in either the clockwise or counterclockwise direction by motor 154 independent of the tire tool drive shaft 132. When the ram 121 is rotated by its drive mechanism, cooperation of the ram's exteriorly threaded surface 137 with the follower nut 125 causes the ram shaft to extend or retract relative to the center plane 11 of the tire cage 10, i.e., relative to any tire 19 positioned within the tire cage. This allows ram nose 119 to laterally reciprocate along the main frame's center axis 14 without rotation for the reason that same is fixed to the cross frame 124 through bearing support housing 134. Therefore, the ram nose 119 does not rotate, even though the ram 121 may rotate and even though the tire tool drive shaft 132 may rotate. Linear extension of the ram nose 119 along the center axis 14 is stopped when a lug 158 (fixed adjacent the rear end of movable frame 126) trips a front limit switch 159, and linear retraction of the ram nose 119 is stopped when lug 158 trips a rear limit switches 159, 161 being fixed in place and electrically connected with ram motor 154.

TIRE TOOLS

Various tire tools are provided to cooperate with the ram nose 119, the tire tool drive shaft's adapter socket 150 and the main frame 10, depending on the type rim or wheel which it is desired to process with the tire changer machine. Those tools illustrated in FIGS. 9–11 are adpated to interconnect with the ram nose 119, those tools illustrated in FIG. 12 are adapted to interconnect with the tool drive shaft's adapter 150, and that tool illustrated in FIG. 13 is adapted to interconnect with the tire cage or main frame 10.

The tool illustrated in FIGS. 9–10A is a rim holder 165 adapted to restrain a rim 166 (with or without a tire thereon), see FIG. 16, in fixed operating relation with the ram nose 119. The rim 166 may be of a flat base type (illustrated in FIG. 16), or of a drop center type (not shown). The rim holder 165, as shown in FIGS. 10 and 10A, includes hub 167 to which is fixed three hands 168 in sliding relation thereto at equiangular positions about the hub. Each hand 168 includes a finger 169 and a palm 170, the finger being adapted to partially overlie or curve over that flange edge 171a of the rim 166 which incorporates a lock ring 172, and the palm being adapted to press against the inner surface 133 of the rim, when the rim is mounted on the rim holder 165 as illustrated in FIG. 16B. Each hand 168 of the rim holder 165 is mounted to an arm 174 which is slidably received in guideway 175, the guideways being fixed to the hub 167 in equilateral triangular fashion, such as by welding or the like. Each guideway 175 includes a slot 176 running longitudinally therealong, that slot receiving a positioner pin 177 fixed to the associated arm 174.

A positioner plate 178 is rotatably mounted on the hub 167 of the rim holder 165, the positioner plate being rotatably connected with the hub between snap ring 179 and the three guideways 175 fixed to the hub. The positioner plate 178 is circular in outer circumference, and includes three slots 180 disposed radially at equiangular distances around the center axis 181 of the rim holder. Each of the three positioner plate slots 180 is adapted to overlie each of the three respective guideway slots 176, the follower pin 177 fixed to each of the arms 174 thereby extending through a guideway slot 176 as well as the related follower plate slot 180. A peripheral section of the follower plate 178 is provided with a toothed periphery, as at 182, and a spring 183 loaded pawl 184 pivotally mounted at one end 185 to one of the guideways 175 is adapted to interengage that toothed periphery 182 to hold the radially adjustable hands 168 in the desired location. Socket 186 in the positioner plate 178 is adapted to receive a socket wrench, not shown, to provide a handle for rotating the positioner plate into the desired position. Thus, hands 168 are extendable and retractable relative to the hub 167 (and, therefore, relative to the center axis 181 of the rim holder 165) by virtue of rotation of the positioner plate. As the positioner plate is rotated counterclockwise, as shown in FIg. 10, the rim holder's fingers 169 will extend radially outwardly relative to the center axis 181 of the rim holder 165. Once in a desired location, the spring-loaded pawl 184 retains the positioner plate in that location, thereby retaining the fingers 169 in the desired orientation. The fingers are movable between an inner limit as illustrated in FIG. 10 in solid lines where the positioner plate's slots 180 are transverse to the guideway slots 176, and an outer limit shown in phantom lines where the positioner plate slots 180 are angulated relative to the guideway slots 176.

In use, the rim holder 165 is threadably engaged with the ram nose 119 since the hub's inner surface 187 is threaded to match the threaded exterior surface of the ram nose 119. When positioned on the ram nose 119, the keyway 188 in the hub 167 is aligned with the keyway 189 in the ram nose, and a key 190 (as shown in FIG. 9) is inserted to prevent inadvertent rotation thereafter of the rim holder 165 relative to the ram nose during operation of the ram 121 as described below. Thereafter, the rim 166 is coaxially disposed with the rim holder 165, the rim holder is positioned in the plane of the rim at the locking edge 171a thereof, and the hands 168 radially extended by rotating positioner plate 178 until the palms 170 press against the inner surface of the rim and the fingers 169 grab the outer edge of the rim as seen in FIG. 16B, thereby mounting the rim to the ram 121.

The tool illustrated in FIG. 11 is for mounting wheels 193 (FIG. 18) to the ram nose 119. The wheel holder 194 is of two main parts, namely, a base plate 195 and a crown 196. The base plate 195 includes a primary hub 197 provided with a series of stepped concentric flanges 198, these flanges being provided to accomodate wheels having axle holes of varying sizes so as to seat each wheel's center web 199 securely against the base plate's hub as is illustrated in FIG. 18. The base plate 195 also includes a stud 200 fixed thereto, the stud being pivotally fixed as at 201 to that side of the base plate opposite to the primary hub 197 and extending through port 202 formed in the base plate, thereby limiting the pivotal motion of the stud. The stud 200 is adapted to pass through a stud bolt hole 203 in the wheel's web 199, thereby preventing the wheel from rotating relative to the primary hub 197 and base plate 195 when it is mounted thereto. The crown 196 is in the nature of a ring 204 axially offset from and fixed to a secondary hub 205 through spokes 206, the inner periphery of the primary 197 and secondary 205 hubs being of identical diameter and being threaded as at 207.

In use, the base plate 195 is first threaded onto the ram nose 119, the key 190 being inserted into the aligned keyways 208, 189 of the hub 197 and ram nose 119, respectively. Thereafter a wheel 193 is seated on the hub 197, and lug bolt 200 positioned to protrude through one of the lug bolt holes 203 in the wheel's web 199. The crown 194 is then threaded onto the ram nose 119, the wheel's web 199 (and therefore, the wheel 193) being trapped and securely seated on the properly sized stepped flange 198 of the hub 197 by ring 204 forcing the wheel's web into that seating relation as illustrated in FIG. 18, thereby mounting the wheel 193 to the ram 121.

Mount/demount tool 211 illustrated in FIG. 12 cooperates with a special yoke 212 to interconnect the tool 211 with the tire tool drive shaft 132. The mount/demount tool yoke 212 presents a square formed end 213 adapted to be received through the hollow ram nose 119 into connected relation with the square formed socket 150 on the front end of the tire tool drive shaft 132. One finger 191 of the yoke 212 is longer than the other finger 192, and that longer finger 191 carries a latch thumb 209 pivotally mounted as at 210 and spring 163 loaded against stop edge 164. The latch thumb 209 permits easy access of the mount/demount tool 211 into the yoke's throat 161, but prevents inadvertent disengagement of the tool with the yoke during use thereof. The yoke 212 is of a length such that, in use, yoke end 214 extends outwardly beyond the ram nose 119 when the yoke is connected with the drive shaft 132 as illustrated in FIG. 19A. The mount/demount tool 211 includes a demount end 215 in the form of a single finger extending from a center bar section 216, and a mount end 217 in the form of a spade fixed to the end of neck 218 at the other end of the center bar section. Note that the spade 217 is slightly angulated, and is positioned transverse, relative to the longitudinal axis 219 of the mount/demount tool 211. The center section 216 of the mount/demount tool is sized to fit, and be restrained, between fingers 220 of the yoke end 214, see FIGS. 19A and 20a. Use of this mount/demount tool 211 in mounting and demounting a tire 19 is primarily limited to rims or wheels having integral flanges where at both edges thereof, i.e., where the tire's beads must be lifted up and over a flange when the tire is being demounted, and where the tire's beads must be pushed down and over a flange when the tire is being mounted.

The last tire tool of those illustrated in FIGS. 8–13 is that one shown in FIG. 13. The friction latch tire tool 221 is adapted to interconnect with the tire cage frame, i.e., with the main frame 10, and is also used for demounting and mounting a tire with a wheel or rim. The main frame 10, on the side frame member 21a at the front face 12 of that main frame, includes a U-shaped restraint bracket 222 fixed to that frame member 21a, see FIGS. 1 and 21. It is by means of this restraint bracket 222, in combination with the friction latch tire tool 221 itself, that the tire tool 221 is restrained in operating engagement with the main frame of the tire machine during use of the tool 221. The friction latch tool 221 is of a generally L-shaped configuration having a push/pull foot 223 fixed to one end of location rod 224, a handle 225 being fixed to the other end of that location rod. The push/pull foot 223 is of a length approximating the side wall width of an average tire 19 to be serviced by the tire changer machine. A friction latch 226 is interposed on the location rod 224 of the tire tool 221. The friction latch 226 is in the nature of an inverted T-shaped member, the stem plate 227 of the T-shaped member being provided with a port 228 of an inside diameter slightly greater than the outside diameter of the tool's location rod. Restraint plate 229 is fixed to the stem plate 227 in a plane transverse thereto, the restraint plate presenting front 230 and rear 231 hands. In use, and depending on whether the ram 121 is operated to push a tire 19 onto a wheel 193 against the tire tool 221 (FIG. 21A), or whether the ram 121 is operated to pull a tire off a wheel with the tire tool (FIG. 21), the front hand 230 or rear hand 231, respectively, (and, hence, the friction latch), is wedged into fixed or immobile relation with the restraint bracket 222 fixed to the main frame.

OPERATION OF THE TIRE CHANGER MACHINE

As previously mentioned, the tire changer machine of this invention is particularly adapted for use in connection with truck tires. Further, the tire changer machine of this invention is structured so that same is useful in connection with rims 166 or wheels 193, the rims and wheels being of either the flat base (see FIG. 16 for a flat base rim) or drop center type (see FIG. 18 for a drop center wheel).

Use of the tire changer machine of this invention in connection with a flat base rim 166 of the removable flange 234 type is particularly illustrated in FIGS. 14–17A.

As shown in FIG. 14, the rim holder is first mounted in place on the non-rotating nose 119 of the ram 121 with the ram in the fully retracted attitude (see FIG. 2). Such is accomplished by threadably engaging the rim holder's hub 166 with the threaded ram nose 119 and, thereafter, seating key 190 in the keyways 188, 189 defined in the rim holder's hub and the ram nose, respectively. The hands 168 of the rim holder 165 are maintained in the innermost or retracted attitude as illustrated in FIG. 10 when same is initially connected with the ram nose.

As shown in FIG. 14 also, the tire 19 (seated on rim 166) with inner tube 242 is then rolled up the ramp 29 through the ingress/egress opening of the tire cage or main frame 10 until same rests on tire rollers 27, 28. As initially rolled into the main frame, the weight of the tire 19 and the rim 166 would depress the frame's floor rollers 27, 28 into an attitude adjacent ground level 32 if those rollers are not already retained in an intermediate location by spring 58 loaded latch pin 56 and rack 50 of the roller positioner device 46. In this initial posture, the tire 19 is positioned in approximately the center plane 11 of the main frame but is not coaxial with the center axis 14 of the main frame. The tire 19 is subsequently elevated into coaxial relation with the center axis 14 by use of the manually operable tire positioner device 46. Handle 47 of the device is gripped by an operator, and trigger 53 squeezed to remove latch pin 56 from interengagement with the rack 50. The handle 47 is then rotated until the tire support rollers 27, 28 (and, hence, the tire 19 carried thereby)

are positioned (through linkage 33, 35, 37, 63) at that attitude where the rotational axis of the rim 166 is coaxially disposed with the center axis 14 of the main frame 10 (and, hence, with the center axes 235, 181 of the ram 121 and rim holder 165, respectively). The trigger 53 is then released so that the latch pin 56 engages the rack 50, thereby restraining the rollers 27, 28 (and, hence, the tire 19) in the desired operational attitude vis-a-vis the ram 121 and the rim holder 165. Lifting of the tire 19 into the desired coaxial location with the ram 121 and rim holder 165 is aided by helper spring 41 which biases the rollers 27, 28 vertically upward.

Thereafter, the ram 121 is extended by depressing foot pedal 156 until the rim holder 165 is positioned adjacent to the plane of the lock ring edge 171a of the rim 166 (FIG. 16). The hands 168 of the rim holder 165 are then extended into operational engagement with the now coaxially 235, 14 disposed rim, see FIGS. 15, 16, and 16B. Such extension of the rim holder's hands 168 is achieved by rotation of the positioner plate 178 through use of an Allen wrench (not shown) seated in socket 186 of the positioner plate until the palms 170 of the hands 168 are seated against the inner surface 173 of the rim 166, and the finger 169 grip edge 171a of the rim, see FIG. 16B. The hands 168 are restrained in the so extended position by cooperation of spring loaded pawl 184 with the positioner plate's toothed periphery 182. In this connection, note particularly that the rim 166 has been oriented within the tire cage 10 such that the lock ring edge 171a of the rim is adjacent the front face 12 of the main frame 10; this orientation of a lock ring type rim or wheel must be provided to permit proper operation of the tire changer machine. In other words, and if the lock ring edge 171a of a rim or wheel is positioned adjacent the rear face 13 of the main frame 10, the tire changer machine will not function in the contemplated manner.

After the tire 19 and rim 166 have been mounted on the ram nose 119 by the rim holder 165, the baed breaker blades 68–71 are then radially disposed immediately adjacent the removable flange edge 234 of the rim, see FIG. 15. Such radial adjustment of all the bead breaker blades 68–71, both at the front face 12 as well as at the rear face 13 of the main frame 10, is accomplished by manual operation of the blade positioner device 74. Such operation is carried out by gripping the device's handle 90 and pulling trigger 91 so as to remove latch pin 92 from latching relation with the fixed rack 97. The handle 90 is then moved in a horizontal plane to rotate front drive rod 89 (directly fixed to the handle), as well as rear drive rod 112, the drive rod being connected through front 113 and rear 114 transfer arms and connecting transfer arm 115 to establish rotation of the drive rods in a simultaneous and equivalent fashion. Motion of the handle 90 thereby activates both the top and bottom linkage systems (100, 102, 104, 106, 107, 109, 110, 111) at both the front 12 and rear 13 faces of the frame for all blades 68–71. Since the linkage systems are identical one with the other for the top blades 68a, 71a and the bottom blades 69a, 70a at the front face 12 of the main frame 10, and for the top blades 68b, 71b and the bottom blades 69b, 70 b at the rear face 13 of the frame, all blades 68–71 are radially extended or retracted relative to the frame's center axis 14 as desired in equivalent and simultaneous fashion. The blades 68–71 are oriented so as to position the working edges 237 of each blade as closely adjacent, but not overlying, the flange 234 of the rim 166 fixed in place to the ram nose 119 by the rim holder 165, see FIGS. 15 and 16. When the trigger 91 is released, latch pin 92 is spring biased into latchup relation with the rack 97, thereby restraining the blades 68–71 in the desired radial orientation.

After the rim 166 has been fixed in place on the ram nose 119 and the bead breaker blades properly located, the ram 121 is then extended in the direction of arrow 236 by depression of foot pedal 156 by the machine's operator. This pedal activates the ram motor 154 which rotates the ram 121 through drive sprocket 151. Rotation of the ram 121, by virtue of being interengaged with the fixed follower nut 125, forces the non-rotatable ram nose 119 toward the front face 12 of the main frame 10 in the direction of arrow 236, thereby forcing the front sidewall 238 of the tire adjacent the rim's lock ring 235 against the front faces' bead breaker blades 68a–71a, see FIG. 16A. As the front tire side wall 238 is forced against the blades 68a–71a, the force imparted to the blades causes each blade to pivot on its own pivot axis 72 down behind the removable flange 234 and into juxtaposition with the outer peripheral surface 239 of the rim's flat base so as to break the tire's front bead 240a away from the removable flange, see FIG. 16A. This pivotal motion of the bead breaker blades 68a–71a is limited when those blades' mounting arms contact edges 79 of the blade holder 77. The FIG. 16A posture of the blades 68a–71a and tire 19 is established, and forward motion of the ram 121 in the direction of arrow 236 is terminated, when stop lug 158 activates limit switch 159 to break the circuit for drive motor 154, thereby overriding foot pedal 156.

The FIG. 16A posture of the tire 19 and bead breaker blades 68a–71a is then maintained by the machine while the operator opens the safety cage door 24. The operator then removes the lock ring 172 from the rim 166, and slides the removable flange 234 off the rim, this operational step being significant for the operator since the tire's sidewall 238a is restrained out of contact with the rim flange 234 during removal thereof by the blades 62a–71a. The direction of the ram 121 is thereafter reversed (by depressing pedal 155 for ram motor 154), and caused to move in the direction of arrow 241 as illustrated in FIG. 17 thereby withdrawing the tire 19 from operational engagement with the bead breaker blades 68a–71a in the front face 12 of the main frame 10 and retracting the rear tire sidewall 238b into operational engagement with the bead breaker blades 68b–71b in the rear face 13 of the main frame. The rear bead breaker blades 68b–71b, being structured identical to the front bead breaker blades 68a–71a, work on the rear tire sidewall 238b in the same manner as front bead breaker blades 68a–71a work on the front tire sidewall 238a. That is, as shown in FIG. 17A, the rear bead breaker blades 68b–71b, upon being initially exposed to the force of the rear tire sidewall 238b, pivot on pivot axis 72 until the edges 237 of these blades are in close proximity with the outer surface 239 of the flat base rim 166. As the ram 121 continues to move in the retraction direction, as shown by FIG. 17A, the flat based rim 166 is drawn out of operational relation with the tire 10, since the tire is held within the main frame 10, i.e., is prevented from further rearward retractive movement, by the rear bead breaker blades 68b–71b. The rim 166 may be drawn only partially out of operational relation with the rim 166 to permit replacement of an inner tube 242 as shown in FIG. 17A, or may be drawn out until the rim has been completely separated from the tire. If the rim 166 is completely withdrawn, only the flat base rim 166 is left mounted to the ram nose 119 since the tire 19 is left independent of the rim resting on the tire rollers 27, 28, thereby fully demounting the tire from the rim without need for reversing the rim on the ram nose, i.e., without any manual handling of the tire being required after the tire has been initially rolled into the main frame 10. The fully retracted or rearward position of the rim 166, at which the tire 19 is completely separated from the rim, is established by lug 158 contacting limit switch 161 to break the circuit to ram motor 154 when the fully retracted position of the ram 121 has been achieved.

Whether the demounted tire is to be repaired or replaced, the old tire is rolled out of the tire cage down the ramp 29, and either a repaired or a new tire thereafter rolled back up the ramp into the tire cage. The new tire is automatically located in correct position vis-a-vis the rim 166 because the tire rollers 27, 28 have not had their vertical attitude changed. Further, the substitution of the old tire for a new or repaired tire is easily accommodated because the tire ramp 29 is directly connected to one 27 of the tire rollers for vertical movement therewith.

Once the new or repaired tire is properly positioned in the tire cage 10, and since same is automatically located by rollers 27, 28 in coaxial relation with the rim 166 mounted on the ram 121, and the tube properly inserted, the ram 121 is driven once again toward the main frame's front face 12 or in the direction of arrow 236 to that position shown in FIG. 16A where the tire is totally received on the rim and the front bead breaker blades have pushed the front tire sidewall 238a back from the lock ring 171a of the rim. This position is automatically accomplished because, after the forward pedal 156 which energizes drive motor 154 is depressed by the operator, the forward motion of the ram 121 automatically stops in the desired position shown in FIG. 16A when stop lug 158 on the ram 121 trips limit switch 159. When the rim 166 and tire have achieved the FIG. 16A position during installation, removable flange 234 is then replaced onto the rim 166, and the lock ring 172 fixed in place on the rim. The safety door 24 is now slid closed, with the new tire and rim retracted into coplaner relation with the main frame's center plane 11 out of contact with all bead breaker blades 68–71, the tire is then filled with air. The safety door 24 provides a safety device to protect the machine's operator in case the lock ring 172 is not properly seated and blows off during inflation of the tire. The construction of this door 24 is particularly effective because any force exerted by the inadvertant ring 172 blow off would be normal to this motion required to open the door. That is, the door 24 must be slid open by moving it to the left (as shown in the figure), and not swung open on a pivotal axis.

Once the tire has been inflated, the safety door 24 is opened and the rim holder 165 is released from positive interengagement with the rim 166 by rotating the positioner plate clockwise as shown in FIG. 10, thereby retracting the rim holder's hands 168 from fixed relationship with the rim. The ram 121 is then retracted into the storage attitude, which attitude is automatically obtained by depressing retraction pedal 155 and allowing the force ram to retract until lug 158 energizes limit switch 161 to stop ram motor 154. The fully inflated tire is then rolled out of the main frame 10 down ramp 29 for use. Note particularly that no tire tool is required to mount or demount a tire with that type rim or wheel which employs a lock ring type removable flange 234, i.e., no tire tool as illustrated in FIGS. 12 or 13 is required, for the reason that the tire is simply being forced off upon demounting and forced on upon mounting, once the removable flange is in fact removed from operational engagement with the rim or wheel.

Use of the tire changer machine of this invention with a tubeless tire mounted on a wheel 193 of the type having permanently mounted flanges 243a, 243b is illustrated in FIGS. 18–21A. For demounting the tire from the wheel, and prior to positioning of the tire 19 and wheel 193 in the main frame 10, the base plate 195 of the wheel holder 194 is threaded onto the ram nose 119 with the stepped flanges 198 facing the main frame's front face, see FIG. 18. The tire 19 and wheel 193 is then rolled up the ramp 29 into the main frame 10 where it is coaxially disposed relative to the ram 121 in a manner identical to that described immediately above for a tire on a rim 166. When the wheel 193 is coaxially disposed with the ram 121, the ram nose 119 is then partially extended toward the front face 12 of the main frame 10 until the nose protrudes through the center hole 244 in the wheel's web 199, and the stud 200 protrudes through a stud bolt hole 203 in the wheel's web 199, thereby seating the wheel against the correct size step on the base plate's hub 197. Subsequently, the crown 196 is threaded onto that portion of the ram nose 119 that extends through the wheel's center hole 244, thereby mounting the wheel (and, hence, the tire) on the ram nose.

After the tire and wheel 193 have been mounted on the ram nose 119, the ram is extended until the front face bead breaker blades 68a–71a break the tire's front bead 240a from the wheel's front flange 243a, and thereafter retracted until the rear face bead breaker blades 68b–71b break the tire's rear bead 240b away from the wheel's rear flange 243b. This extension and retraction motion of the ram 121 being controlled, as before described, by the foot pedals 155, 156, stop lug 158 and limit switches 159, 161.

With the tire's beads 240a, 240b thus broken away from the wheel's flanges 243a, 243b, the tire may be demounted from, and a new or repaired tire mounted onto, the wheel 193 by the mount/demount tool 211 illustrated in FIG. 12 for all size truck tires, and may be demounted from, and a new or repaired tire mounted onto, the wheel with the tire tool illustrated in FIG. 13 on certain size tires. The FIG. 12 tire tool 211 usage is illustrated in FIGS. 19–20A. After the wheel 193 has been mounted on the ram nose 119, the tool yoke 212 is telescoped into the ram nose to that position where square end 213 seats in, and is drivingly engaged with, adapter 150 at the head of the tire tool drive shaft 132. When demounting a tire, the finger-like demount end 215 of the tool is interleaved between the front flange 243a and the tire's sidewall bead 240a, and the center bar section 216 of the tool is positioned between the yoke's fingers 220. Thereafter, the tire tool drive shaft 132 is rotated by depressing foot pedal 149 until the first bead 240a is completely lifted over or removed from interengagement with the wheel 193, see FIGS. 19 and 19A. The second bead 240b may be subsequently removed in a like manner. After the old tire is removed completely from the wheel, the ram 121 is completely retracted (as above described in connection with demounting a tire from a rim 166), the old tire rolled out of the cage 10 and a new or repaired tire rolled into the cage. Of course, the mount/demount tool 211 is withdrawn from operational relation with the yoke 212 during this tire substitution so that the old tire can clear the ram nose 119 as it is pulled out of the tire frame 10 and the new tire can likewise clear the ram nose as it is rolled into the tire frame. When mounting the new or repaired tire on the wheel, the ram 121 is first extended into proximity with the frame's center plane 11, the new or repaired tire being positioned between the wheel and the frame's front face 12. The spade or mount end 217 of the tire tool is then interposed between the wheel's front flange 243a and the tire's rear bead 240b, the mount/demount tool 211 thereafter being rotated by drive shaft 132 for pushing the tire's bead 240b over the wheel's flange 243a onto the wheel itself. The tire's front bead 240a is thereafter lifted over the wheel's flange 243a in a similar manner, thereby seating the tire on the wheel. This tire tool 211 method of operation is only used in connection with wheels or rims having integral flanges at both end edges, i.e., with wheels or rims where neither flange is removable.

The FIG. 13 tire tool usage is illustrated in FIGS. 21 and 21A. The friction latch tire tool 221 may be used with certain size tires to pull the tire off a wheel or rim of that type having integral or fixed in place flanges. When demounting a tire 19 from a wheel 193 having permanent flanges 243a, 243b, the beads 240a, 240b of the tire are first broken away from the flanges as described above and shown in FIGS. 18–18B. Subsequently, the tool's foot 223 is interposed between the wheel's front flange 243a and the front tire bead 240a by use of handle 225, the foot being oriented to extend into the tire casing and overlie front tire side wall 238a as shown in FIG. 21. The friction latch 226 is then interengaged with the restraint bracket 222 fixed to the machine's main frame 10, the latch being positioned so that the bracket seats in the corner of the latch's rear hand 231 and stem plate 227 and the location rod 224 being 'drawn tight' by use of handle 225 so as to place the tool 221 in tension. Thereafter, the ram 121 is driven toward the fully retracted position by depressing foot pedal 155, the friction latch 226 preventing the tool's foot from moving therewith because stem plate 227 frictionally grips location rod 224. As the ram 121 retracts the tire's front bead 240a is literally pulled over the wheel's flange 243a. Once the front bead 240a is pulled off the wheel 193, the rear bead 240b can likewise be pulled off the wheel by engaging the tool's foot 223 with the tire's rear side wall 238b and repeating the operation.

I claim:
1. A tire changer machine comprising,
   a main frame having a center axis, a front face and a rear face said center axis being generally horizontal, and each of said faces being in a generally vertical plane,
   a plurality of bead breaker blades fixed to said main frame in each of the front and rear faces,
   blade adjustment structure permitting said bead breaker blades to be radially adjusted relative to the center axis of said main frame, said blade adjustment structure including a blade linkage system interconnecting all of said bead breaker blades located in the front face of said machine with all the bead breaker blades located in the rear face of said machine, said linkage system being structured such that all of said blades are adjusted simultaneously and equally relative to the center axis of said main frame;
   floor structure connected to said main frame, said floor structure being vertically adjustable so as to permit positioning of a tire thereon in concentric relation with the center axis of said main frame,
   a ram coaxially aligned with the center axis of and connected to said main frame, said ram being adapted to reciprocate between a retracted position and an extended position relative to the front and rear faces of said main frame, and
   a holder structure mounted on said rim, said structure being adapted to mount either a rim or a wheel on said ram in fixed relation thereto.

2. A tire changer machine as set forth in claim 1 including
   a tool drive shaft concentric coaxially aligned with said ram, said tool drive shaft being rotatable relative to said ram.

3. A tire changer machine as set forth in claim 1 including
   structure pivotally mounting each of said bead breaker blades, said structure presenting a pivot axis in the front or rear face, respectively, of said main frame, and
   limit stops fixed to said pivotal mounting structure to define a limited length pivot path for each of said blades.

4. A tire changer machine as set forth in claim 1 including
   a blade positioner device comprised of a manually operable handle associated with a rack, said handle being interconnected with said linkage system and presenting a latch pin continuously biased toward said rack, the position of said bead breaker blades being retained as set by said manual handle through interengagement of said latch pin with said rack.

5. A vertical adjustable support mechanism for a tire changer machine, that support mechanism adapted to support a tire in generally vertical orientation within the tire frame of that machine, said support mechanism comprising
   at least two rollers, said rollers being movably connected to said frame,
   a roller positioner device manually operable to raise or lower said rollers into the desired vertical position,
   a ramp pivotally interconnected at one end with said rollers, said ramp resting on the floor at the other end thereof, said pivotal interconnection permitting said ramp to move vertically at said one end in response to the raising or lowering of the roller while remaining on the floor at the other end,
   a helper spring continuously biasing said rollers toward an elevated position relative to floor level, said helper spring aiding manual operation of said roller positioner device when raising said rollers into the desired vertical position, and
   bellcrank structure mounting each of said rollers to said tire frame, each of said rollers being vertically adjustable by pivotal motion of said bellcranks.

6. A vertically adjustable support mechanism as set forth in claim 5 including
   a roller linkage system which connects the bell cranks for each of said rollers, said linkage system being connected with said roller positioner device, said linkage system thereby permitting said rollers to be each adjusted simultaneously and equally to the desired vertical position upon operation of said roller positioner device.

7. A vertical adjustable support mechanism for a tire changer machine, that support mechanism adapted to support a tire in generally vertical orientation within the tire frame of that machine, said support mechanism comprising at least two rollers, said rollers being movably connected to said frame, a roller positioner device manually operable to raise or lower said rollers into the desired vertical position, a ramp pivotally interconnected at one end with said rollers, said ramp resting on the floor at the other end thereof, said pivotal interconnection permitting said ramp to move vertically at said one end in response to the raising or lowering of the roller while remaining on the floor at the other end, a helper spring continuously biasing said rollers toward an elevated position relative to floor level, said helper spring aiding manual operation of said roller positioner device when raising said rollers into the desired vertical position, a manually operable handle connected to said frame, and a latch pin operatively associated with a fixed rack connected to said frame, said latch pin being connected to said handle and being continuously biased into latching relation with said rack, the vertical position of said rollers being adjusted by manual operation of said handle with said rollers being maintained in that desired vertical position by engagement of said latch pin and said latch handle.

8. In a tire changer machine of the type that incorporates a series of bead breaker blades adapted to break the tire's beads away from the flanges of a wheel or rim, the improvement comprising a ram mechanism comprising a ram shaft and a stationary frame fixed in place relative to said shaft, one of said ram shaft and stationary frame mounting a follower nut and the other of said ram shaft and fixed frame being threaded on a surface thereof juxtaposed to said follower nut, said ram shaft being located in threaded operational relation with said follower nut, a ram nose connected to said ram shaft, said connection permitting said ram shaft to rotate independent of said ram nose, and drive means operationally connected with said ram shaft for rotating same, thereby allowing said ram nose to be extended and retracted as desired relative to the plane of a tire mounted on said machine.

9. A ram mechanism as set forth in claim 8, said ram mechanism including a tire tool drive shaft concentric with said ram, said tire tool drive shaft being rotatable relative to said ram.

10. A ram mechanism as set forth in claim 8, said ram nose being threaded on the exterior surface thereof, said threaded nose thereby being adapted to mount a rim holder or a wheel holder in fixed engagement therewith.

11. A ram mechanism as set forth in claim 9, said tire tool drive shaft including a socket adapted to receive a tire tool in driving relationship therewith.

12. In a tire changer machine, the improvement comprising a tire tool adapted to pull a tire off a wheel or rim, as well as push a tire onto a wheel or rim, said tire tool being removably connected directly with the stationary main frame of a tire changer machine, said tire tool comprising a rod-shaped member having a foot at one end thereof, said foot being angularly disposed relative to said rod-shaped member, a friction latch interposed on said rod member intermediate the ends thereof, said friction latch including a plate portion defining a port through which said rod extends which is of slightly greater cross-sectional area than the cross-sectional area of said rod, thereby permitting said plate to be easily positioned along the length of said rod as desired preparatory to use, and a bracket fixed to the main frame of said tire changer machine, said bracket being adapted to receive said friction latch in connected relation during use of said tool, the force exerted on said rod-shaped member during use with a tire causing said friction latch to restrain said rod at the set position relative to said friction latch as the tire is being demounted or mounted.

13. A method of mounting or demounting a tire from a rim or wheel comprising the steps of mounting the tire on a force ram, thereafter pushing said tire against a first series of bead breaker blades fixed in place relative to the axis of rotation of said tire, pulling said tire against a second series of bead breaker plates fixed in place relative to the axis of rotation of said tire without removing said tire from said force ram, thereby breaking both tire beads away from the wheel or rim flanges, frictionally latching a tire tool to the machine's main frame, interengaging said tire tool with the tire's sidewall, and at least one of pulling said tire away from said frictionally restrained tire tool to demount said tire from said rim or wheel, and pushing said tire toward said frictionally restrained tire tool to mount said tire onto said rim or wheel.

* * * * *

UNITED STATES PATENT AND TRADEMARK OFFICE
CERTIFICATE OF CORRECTION

PATENT NO. : 3,958,618
DATED : May 25, 1976
INVENTOR(S) : Maurice A. Reuther

It is certified that error appears in the above-identified patent and that said Letters Patent are hereby corrected as shown below:

Column 11, line 31, between the words "rear" and "limit" please insert --limit switch 161, the--.

Column 12, line 26, change "FIg" to --Fig--.

Column 13, line 49, change "20a" to --20A--.

Column 16, line 18, change "235" to --234--.

Column 17, line 35, between "ring" and "171a" please insert --edge--.

CLAIM (1)
Column 20, line 13, change "rim" to --ram--.

Signed and Sealed this

Twenty-fifth Day of January 1977

[SEAL]

Attest:

RUTH C. MASON
Attesting Officer

C. MARSHALL DANN
Commissioner of Patents and Trademarks